(12) United States Patent
Proefke et al.

(10) Patent No.: US 7,990,254 B2
(45) Date of Patent: Aug. 2, 2011

(54) METHOD AND SYSTEM FOR CONTROLLING AN IGNITION SWITCH AND AN OPERATIONAL STATE OF A VEHICLE

(75) Inventors: David T. Proefke, Madison Heights, MI (US); David R. Mick, Clarkston, MI (US); Kimberly A. Morse-Harvey, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1049 days.

(21) Appl. No.: 11/778,794

(22) Filed: Jul. 17, 2007

(65) Prior Publication Data
US 2009/0021344 A1    Jan. 22, 2009

(51) Int. Cl.
*B60R 25/10* (2006.01)
*B60R 25/04* (2006.01)
*G05B 19/00* (2006.01)
*G05B 23/00* (2006.01)
*E05B 17/00* (2006.01)
*H01H 47/00* (2006.01)

(52) U.S. Cl. .................. 340/426.3; 340/5.6; 340/5.65; 307/10.3; 307/10.5

(58) Field of Classification Search .......... 340/5.6–5.67, 340/426.3; 307/10.3–10.6
See application file for complete search history.

(56) References Cited

U.S. PATENT DOCUMENTS

| | | | | |
|---|---|---|---|---|
| 5,801,614 | A | * | 9/1998 | Kokubu .................... 340/425.5 |
| 5,977,655 | A | * | 11/1999 | Anzai .......................... 307/10.3 |
| 2003/0210130 | A1 | * | 11/2003 | Toyomasu et al. ........... 340/5.31 |
| 2005/0012593 | A1 | * | 1/2005 | Harrod et al. ................ 340/5.72 |

* cited by examiner

*Primary Examiner* — Benjamin C Lee
*Assistant Examiner* — Michael Shannon
(74) *Attorney, Agent, or Firm* — Ingrassia Fisher & Lorenz, P.C.

(57) ABSTRACT

Methods and systems for controlling an operational state of a vehicle having a keyless rotary ignition switch and a locking mechanism coupled to the keyless rotary ignition switch are provided. The locking mechanism is disengaged to allow the keyless rotary ignition switch to be rotated from a first position to a second position by a user when an electronic authorization is detected. The locking mechanism is engaged to prevent the keyless rotary ignition switch from being rotated from the first position to the second position by the user when no electronic authorization is detected.

18 Claims, 4 Drawing Sheets

METHOD AND SYSTEM FOR CONTROLLING AN IGNITION SWITCH AND AN OPERATIONAL STATE OF A VEHICLE

TECHNICAL FIELD

The present invention generally relates to ignition switches, and more particularly relates to a method and system for controlling an ignition switch, as well as an operational state, of a vehicle.

BACKGROUND OF THE INVENTION

In recent years, advances in technology, as well as ever evolving tastes in style, have led to substantial changes in the design of automobiles. One of the changes involves the complexity of, and convenience offered by, the systems used to gain entry into and start automobiles.

One recent modernization of ignition systems is the advent of "keyless" ignition systems with "push-button" starting. Such systems use electronic keys that do not have to be inserted into the ignition switch of the automobile but merely present in a predetermined authorization zone, such as the passenger compartment of the automobile, to start the automobile. When the automobile detects that an authorized electronic key is within the authorization zone, the driver may start the automobile by simply pressing the ignition button. If the automobile does not detect an authorized key within the authorization zone, the automobile disables the ignition button so that the automobile can not be started.

One drawback of keyless ignition systems is that in order for an automobile to be fitted with such a system, many components of the automobile that form the conventional key lock rotary ignition system must be replaced. Thus, the keyless ignition systems greatly increase the manufacturing costs and complexity of the automobile. As a result, in order to reduce costs, manufacturers often include keyless ignition systems as standard equipment. However, including the keyless ignition systems as standard equipment forces automobile manufacturers to increase the suggested retail price on the automobile, which reduces the customer base for any particular automobile, and reduces sales. Another drawback of typical keyless ignition systems is that the use of the ignition button, as opposed to rotary ignition switch, causes some drivers to feel uncomfortable because of the lack of familiarity with starting an automobile with the push of a button, as opposed to the turn of a switch.

Accordingly, it is desirable to provide a method and system for controlling the operational state of a vehicle that combines the convenience of modern keyless ignition systems with the familiarity of conventional rotary ignition switches. It is also desirable to provide a keyless ignition system that may be installed relatively easily and inexpensively as optional equipment on an automobile usually equipped with a key lock, rotary ignition switch. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for controlling an operational state of a vehicle having a keyless rotary ignition switch and a locking mechanism coupled to the keyless rotary ignition switch is provided. The locking mechanism is disengaged to allow the keyless rotary ignition switch to be rotated from a first position to a second position by a user when an electronic authorization is detected. The locking mechanism is engaged to prevent the keyless rotary ignition switch from being rotated from the first position to the second position by the user when no electronic authorization is detected.

A method for controlling an operational state of an automobile having a keyless rotary ignition switch and a locking mechanism coupled to the keyless rotary ignition switch is provided. The method includes engaging the locking mechanism to prevent the keyless rotary ignition switch from being rotated from an ON position to an OFF position if at least one of a transmission of the automobile is in an operational mode and a speed of the automobile is greater than a predetermined threshold and disengaging the locking mechanism to allow the keyless rotary ignition switch to be rotated from the ON position to the OFF position if the transmission of the automobile is in a non-operational mode and the speed of the automobile is not greater than the predetermined threshold.

An automotive control system is provided. The system includes a keyless rotary ignition switch being rotatable between first and second positions, a locking mechanism coupled to and engageable with the keyless rotary ignition switch to prevent the rotation of the keyless rotary ignition switch, and a processor in operable communication with the keyless rotary ignition switch and the locking mechanism. The processor is configured to disengage the locking mechanism to allow the keyless rotary ignition switch to be rotated from a first position to a second position by a user when an electronic authorization is detected and engage the locking mechanism to prevent the keyless rotary ignition switch from being rotated from the first position to the second position by the user when no electronic authorization is detected.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-6 are merely illustrative and may not be drawn to scale.

FIG. 1 to FIG. 6 illustrate a method and system for controlling an operational state of a vehicle having a keyless rotary ignition switch and a locking mechanism coupled to the keyless rotary ignition switch. The locking mechanism is disengaged to allow the keyless rotary ignition switch to be rotated from a first position to a second position by a user when an electronic authorization is detected. The locking mechanism is engaged to prevent the keyless rotary ignition switch from being rotated from the first position to the second position by the user when no electronic authorization is detected.

In particular, the method and system controls the activation of the locking mechanism, or interlock device, which enables and disables the rotation of an ignition switch control. The ignition switch control does not require the presence of a mechanical key for operation to be allowed. Rather, non-contacting communication between the vehicle and an electronic key determines authorization.

Figure 1:
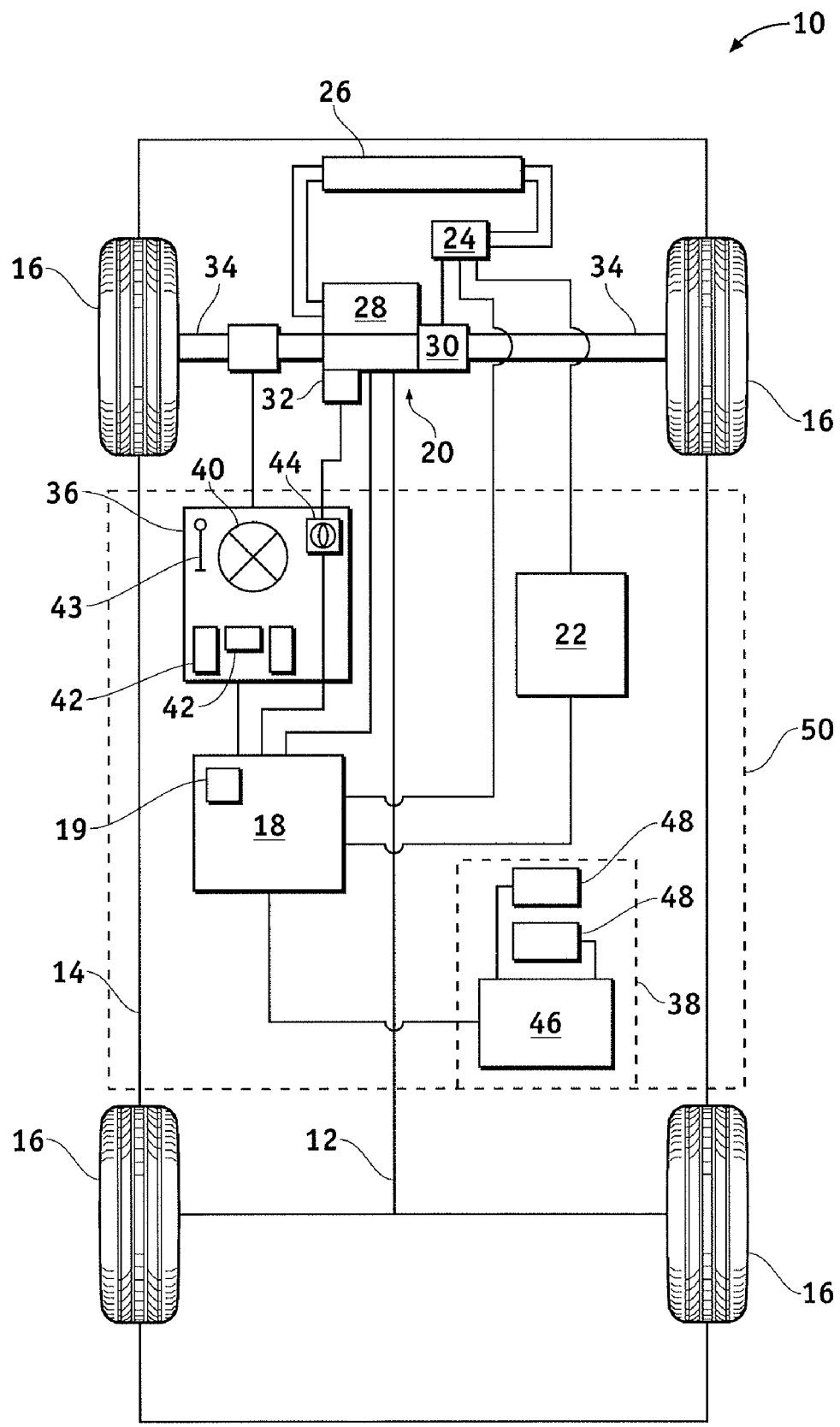
FIG. 1 is a schematic view of an exemplary vehicle according to one embodiment of the present invention.

FIG. 1 illustrates a vehicle 10, or "automobile," according to one embodiment of the present invention. The vehicle 10 includes a chassis 12, a body 14, four wheels 16, and an electronic control system 18. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 10 is a hybrid vehicle, and further includes an actuator assembly 20, a battery 22, a power inverter assembly (or inverter) 24, and a radiator 26. The actuator assembly 20 includes a combustion engine 28, an electric motor/generator (or motor) 30, and a starter 32 coupled to the combustion engine 28. As will be appreciated by one skilled in the art, the electric motor 30 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 30 may include multiple electromagnetic poles (e.g., sixteen poles), as is commonly understood.

Still referring to FIG. 1, in one embodiment, the combustion engine 28 and the electric motor 30 are integrated such that both are mechanically coupled to at least some of the wheels 16 through one or more drive shafts 34. The radiator 26 is connected to the frame at an outer portion thereof and although not illustrated in detail, includes multiple cooling channels therethrough that contain a cooling fluid (i.e., coolant) such as water and/or ethylene glycol (i.e., "antifreeze) and is coupled to the engine 28 and the inverter 24. In the depicted embodiment, the inverter 24 receives and shares coolant with the electric motor 30. The radiator 26 may be similarly connected to the inverter 24 and/or the electric motor 30.

The electronic control system 18 is in operable communication with the actuator assembly 20, the battery 22, and the inverter 24. Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below. In the depicted embodiment, the electronic control system 18 also includes a warning device 19, which may be, for example, an audio speaker, a light emitting diode (LED), and/or a display device.

Of particular interest in the embodiment illustrated in FIG. 1, the vehicle 10 also includes an automotive control subsystem 36 and a keyless start subsystem 38. The automotive control subsystem 36 is in operable communication with the electronic control system 18 and includes a steering mechanism (i.e., steering wheel) 40, multiple control pedals (e.g., accelerator pedal, brake pedal, and clutch pedal) 42, a transmission control 43, and an ignition switch 44. Although not specifically shown, the transmission control 43 is moveable between various positions to set the vehicle's transmission into various modes and/or gears. The keyless start subsystem 38 includes a keyless start control module 46 and at least one antenna 48. In one embodiment, the keyless start subsystem 38 includes two antennas 48 (i.e., a low frequency antenna and a high frequency antenna). Although not shown, the keyless start control module 46 may include a Radio Frequency Identification (RFID) reader and/or a radio frequency (RF) receiver, as is commonly understood.

As will be appreciated by one skilled in the art and described in greater detail below, the keyless start subsystem 38, and in particular the antennas 48, may define a keyless entry authorization zone (or simply "authorization zone") 50 for the vehicle 10. As shown in the embodiment depicted in FIG. 1, the authorization zone 50 may completely or substantially be within the body 14 (or a passenger compartment) of the vehicle 10. However, it should be understood that in another embodiment, the authorization zone 50 may extend to an area outside of the body 14 of the vehicle 10.

Figure 2:
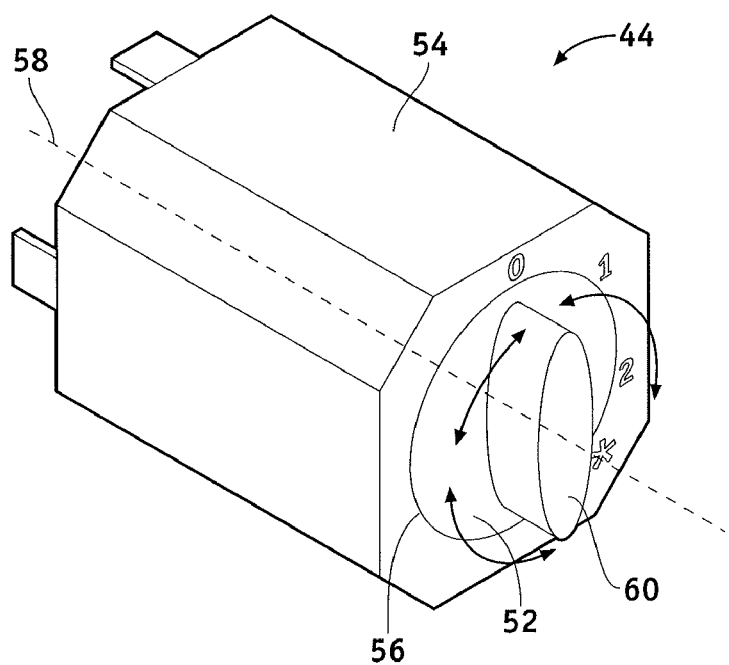
FIG. 2 is a perspective view of an ignition switch within the automobile of FIG. 1.

FIG. 2 illustrates the ignition switch 44 in greater detail. As shown, the ignition switch is a "keyless" rotary ignition switch and includes an ignition rotor 52 and an ignition housing/locking mechanism 54. The ignition rotor 52 is substantially cylindrical and inserted into a passageway 56 extending through the housing/locking mechanism 54 such that the rotor 52 is rotatable within the housing/locking mechanism 54 about a common axis 58. The ignition rotor 52 includes a knob 60 on an end thereof, and in one embodiment, the rotor 52 and the housing/locking mechanism 54 are configured so that the rotor 52 is rotatable to several positions relative to the housing/locking mechanism 54 indicated by the "0," "1," "2," and "*" (i.e., first, second, third, and fourth positions) in FIG.

1. Each of the positions shown in FIG. 2 corresponds to an operational state of the vehicle 10, as controlled with the ignition switch 44 through the electronic control system 18. In one embodiment, the first position is OFF, the second and third positions are ON (i.e., electrical system and engine), and the fourth position is CRANK (i.e., to start the engine and/or motor). Although, not specifically shown, the housing/locking mechanism 54 includes, for example, an electric motor, solenoid, and/or other suitable device to lock the ignition rotor 52 to prevent it from rotating within the housing/locking mechanism 54. In the depicted embodiment, the keyless ignition switch 44 does not include a slot into which a mechanical key may be inserted.

Figure 3:
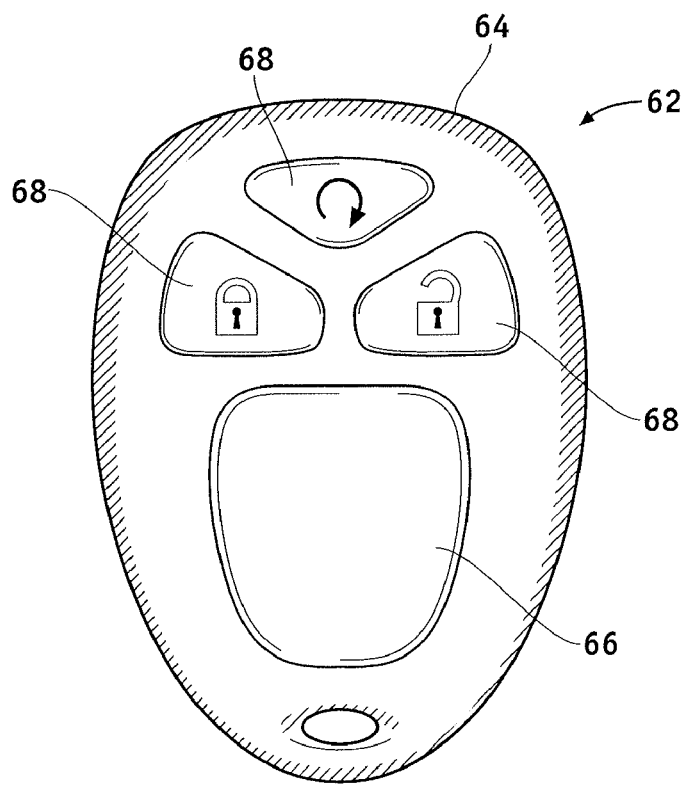
FIG. 3 is a plan view of a keychain fob.

FIG. 3 illustrates a keychain fob, or simply "fob," (or electronic device) 62. In the depicted embodiment, the fob 62 includes a housing 64 with a display screen 66 and multiple buttons 68 thereon, such as a door-lock button, a door-unlock button, and a "panic" button. Although not shown, the fob 62 also includes a RFID chip and/or transmitter within the housing 64.

During operation, the fob 62 shown in FIG. 3 is used by a user (e.g., driver) to gain entry into the vehicle 10 (FIG. 1) via, for example, unlocking the doors and/or trunk of the vehicle 10 with one of the buttons 68 on the fob 62, or via passive entry mechanisms, as are commonly understood. Upon entering a passenger compartment of the vehicle 10, the driver will bring the fob 62 with him or her (e.g., in a pocket of an article of clothing or in a purse) into the authorization zone 50 shown in FIG. 1.

Figure 4:
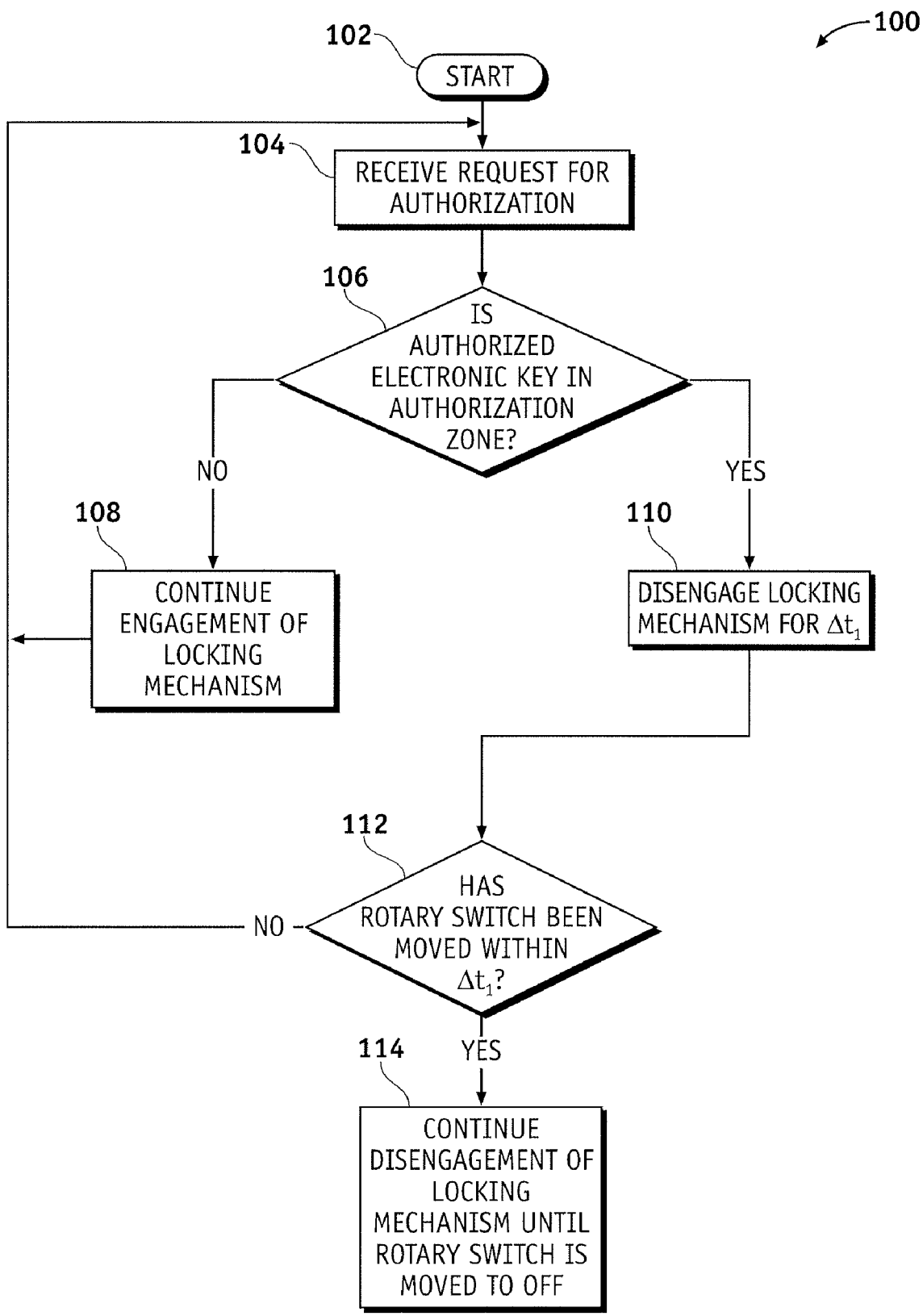
FIG. 4 is a flow chart illustrating a method for controlling an operational state of the vehicle of FIG. 1 according to one aspect of the present invention.

FIG. 4 illustrates a method 100 for controlling an operational state of the vehicle 10, according to one embodiment of the present invention. To rotate the ignition switch to ON, the vehicle operator requests authorization to operate the ignition control by, for example, either axially pressing the rotary ignition control or by pressing the vehicle brake pedal. When the operator requests authorization, the vehicle communicates, for example, via encrypted challenge and response data exchanges, to verify if an authorized electronic key is present in the vehicle interior compartment or other defined authorization zone. When authorization has been determined to be valid, the locking mechanism is commanded (e.g., via a simple or coded interface) to enable ignition switch rotation from the OFF position. Once the switch is rotated beyond the OFF position, the switch is able to be rotated to other positions without additional enabling or authorization until the switch returns to the OFF position. Once switch rotation is enabled and the switch has remained in the OFF position, rotation remains enabled for an adjustable period of time. Additional requests for authorization during the enable time result in resetting of the timer controlling the switch rotation enablement.

With particular reference to FIG. 4, it should be understood that although the method 100 may be described below as being carried out and/or processed by the electronic control system 18 and/or the keyless start subsystem 38, the particular steps described below may be performed by various components within the electronic control system 18 and the keyless start subsystem 38.

The method 100 begins at block 102 with the locking mechanism 54 engaged with the ignition rotor 52 to prevent operation thereof. The user enters the vehicle 10 and requests authorization to operate the ignition switch 44 (i.e. start the vehicle 10). In one embodiment, the request for authorization is sent by the user by pressing the brake pedal and/or pressing (or applying a force onto) the ignition rotor 52 shown in FIG. 2 in a direction parallel to the axis 58.

In one embodiment, the electronic control system 18, at block 104, receives the request for authorization, and at block 106, determines if an authorized electronic key (e.g., the fob 62) is within the authorization zone 50 shown in FIG. 1. As is commonly understood, the RFID chip or transmitter circuit within the fob 62 transmits an identification signal which is received by the antennas 48 (FIG. 1) and sent to the keyless start control module 46. The fob 62 and the keyless start control module 46 communicate via encrypted challenge and response data exchanges to verify if an authorized electronic key is present in the vehicle authorization zone. In another embodiment, this authorization may be granted by the electronic control system 18 determining that access to the vehicle 10 was granted using an authorized electronic device (e.g., the fob 62).

If the keyless start control module 46 does not recognize the signal from the fob 62 as one that has been given access to the particular vehicle 10, a signal is sent to the electronic control system 18 that authorization to operate the ignition switch 44 has not been granted (or simply no signal is sent to the electronic control system 18). As such, at block 108, the locking mechanism 54 (FIG. 2) continues to engage the ignition rotor 52 and prevent operation of the ignition switch 44. Referring again to FIG. 4, the method 100 then returns to block 104 and awaits a request for authorization.

At block 106, if the keyless start control module 46 recognizes the signal from the fob 62 as one that has been given access to the particular vehicle 10, a signal is sent to the electronic control system 18 that authorization to operate the ignition switch 44 has been granted. At block 110, the electronic control system 18 then disengages the locking mechanism 54 of the ignition switch 44 to allow operation (i.e., rotation) of the ignition switch 44. The locking mechanism 54 remains disengaged for a pre-calibrated and adjustable (predetermined) period, or amount, of time ($\Delta t$), such as 5 seconds, during which time the ignition switch 44 may be rotated to the second, third, and fourth positions indicated in FIG. 2.

The method 100 then proceeds to block 112 where it is determined if the ignition switch 44 has been rotated from the first (or OFF) position within the predetermined amount of time. If the ignition switch 44 has not been moved during the predetermined amount of time, the method 100 returns to block 104 and awaits request for authorization.

If the ignition switch has been moved within the predetermined amount of time, the method 100 continues to block 114 at which point the electronic control system 18 maintains the locking mechanism 54 in the disengaged configuration so that the ignition switch 44 may be rotated to any position. The locking mechanism 54 remains disengaged until the ignition switch 44 is returned to the first position.

Figure 5:
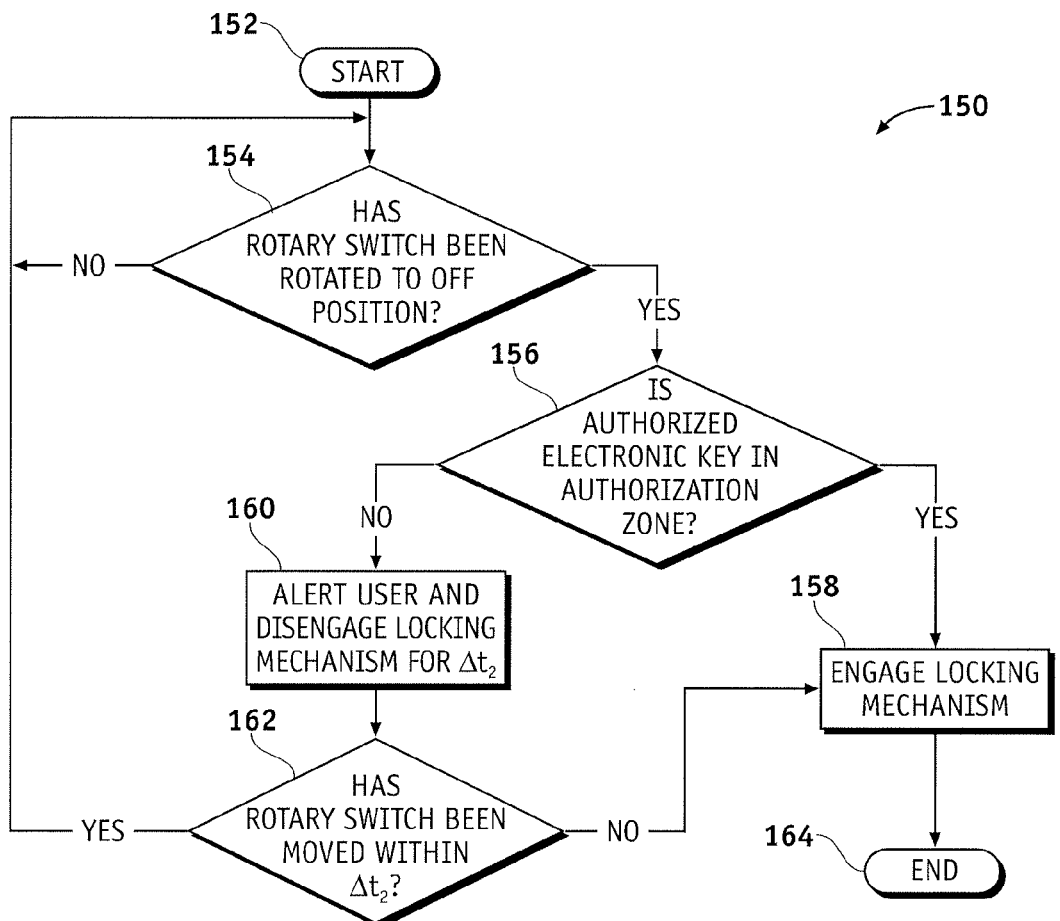
FIG. 5 is a flow chart illustrating a method for controlling an operational state of the vehicle of FIG. 1 according to another aspect of the present invention.

FIG. 5 illustrates another method 150 in accordance with an embodiment of the present invention which may be implemented subsequent to the method 100 shown in FIG. 4. When the ignition switch returns to the OFF position after having been in an ON position, the vehicle immediately attempts to communicate with any electronic keys in the interior compartment or other authorization zone. If a valid electronic key is detected in the authorization zone, the locking mechanism is commanded to disable ignition switch operation until an operator requests new authorization to operate the ignition switch. If a valid electronic key is not detected in the authorization zone, notification is made to the vehicle operator, and the locking mechanism continues to be commanded to enable switch operation in the absence of a valid key to deter valid operators from being stranded without a valid key. When the locking mechanism is enabled in the absence of a valid key, the locking mechanism is commanded to disable operation, and in turn, secure the vehicle when a adjustable time period has extended or the vehicle has been determined to be left unattended (e.g. vehicle locked and/or alarm system armed). When the locking mechanism is enabled in the absence of a valid key, normal system operation resumes when the ignition switch is rotated out of the OFF position.

With particular reference to FIG. 5, the method 150 begins at block 152 with the ignition switch 44 rotated to the second or third positions shown in FIG. 2, which may have occurred during the method 100 shown in FIG. 4. As such, the vehicle 10 (FIG. 1) is in an ON operational state. At block 154, the electronic control system 18 determines if the ignition switch 44 has been rotated back to the first (i.e., OFF) position. When the ignition switch 44 has been returned to the first position, the electronic control system 18 and/or the keyless start subsystem 38 determines if an authorized electronic key is within the authorization zone 50 of the vehicle 10.

If an authorized electronic key is determined to be within the authorization zone 50, the method 150 continues to block 158 and engages the locking mechanism 54 so that re-authorization is required to rotate the ignition switch 44 back to the second or third positions. If no authorized electronic key is determined to be within the authorization zone 50, at block 160 the electronic control system 18 alerts the user via a warning tone, "telltale" (e.g., a recorded message), and/or text message with the warning device 19, that no authorized electronic key is detected within the authorization zone. Thus, the user is warned that the ignition switch will be locked if the vehicle 10 remains in the OFF state. At the same time, the locking mechanism 54 remains disengaged for a predetermined amount of time (i.e., a second, pre-calibrated and adjustable time period), such as 60 seconds. As such, the user is given the opportunity to return the ignition switch 44 to the second or third positions so that the vehicle 10 remains in the ON operational state.

At block 162, the electronic control system 18 determines if the ignition switch has been rotated (i.e., to the second or third position) within the second predetermined amount of time. If so, the vehicle 10 remains in the ON operational state, and the method returns to block 154. If the ignition switch 44 has not been rotated from the first position, the method 150 moves to block 158 at which point the locking mechanism 54 is engaged. The method 150 then ends at block 164, and although not specifically shown, the electronic control system 18 may then return to block 104 of the method 100 shown in FIG. 4.

Figure 6:
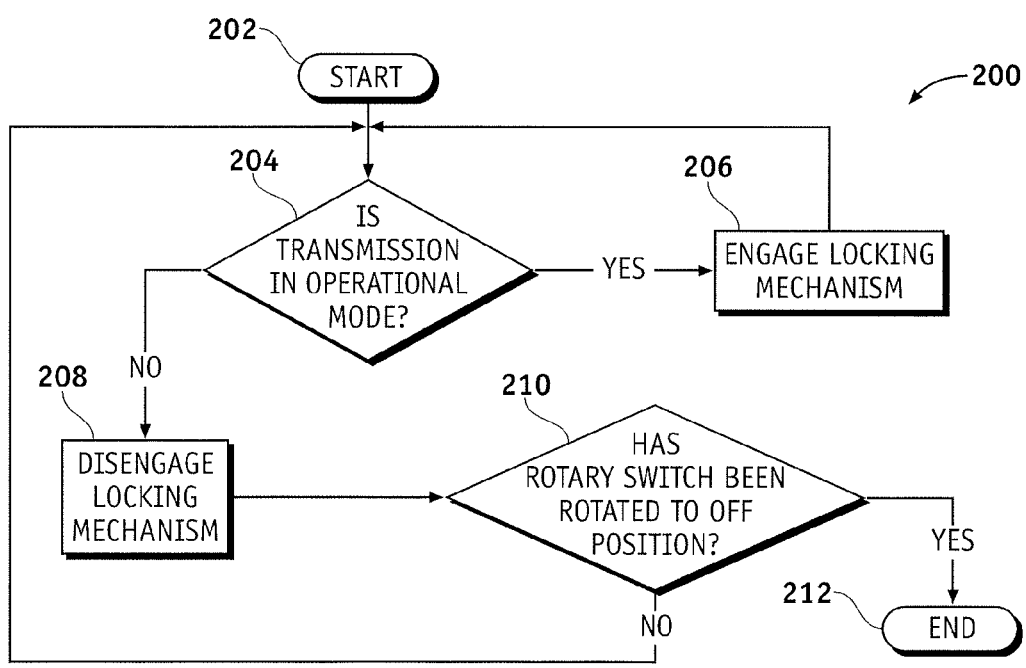
FIG. 6 is a flow chart illustrating a method for controlling an operational state of the vehicle of FIG. 1 according to a further aspect of the present invention.

FIG. 6 illustrates a further method 200 in accordance with an embodiment of the present invention which may be implemented subsequent to the method 100 shown in FIG. 4, and in conjunction with the method 150 shown in FIG. 5. When the shifter in an automatic transmission vehicle is in a position where the transmission cannot be set to "park," the locking mechanism is set (either through circuit interruption or software control) to disable switch rotation back into the OFF position. When the shifter in an automatic transmission vehicle is in a position where it can be locked in Park, the locking mechanism is commanded to enable switch rotation back into the OFF position. When a manual transmission vehicle is in the Run/On or Start/Crank modes or whenever the vehicle's speed is determined to be above an adjustable speed threshold, the locking mechanism is commanded to disable rotation back into the OFF position. When a manual transmission vehicle is in the "accessory" position and vehicle speed is determined to be below an adjustable speed threshold, the locking mechanism is commanded to enable rotation back into the OFF position.

With particular reference to FIG. 6, the method 200 begins at block 202 with the ignition switch 44 rotated to the second or third positions shown in FIG. 2, which may have occurred during the method 100 shown in FIG. 4. As such, the vehicle 10 (FIG. 1) is in an ON operational state at the beginning of the method 200.

At block 204, the electronic control system 18 determines if the transmission of the vehicle is in an "operational" mode. The operational mode for the vehicle may be defined in relation to the transmission as a mode, or gear, in which the vehicle 10 may not be suitably (or safely) parked and/or any time the vehicle is moving at a speed greater than a predetermined threshold. Specifically, such gears for an automatic transmission may be, for example, drive ("D") and reverse ("R").

If the vehicle 10 is determined to be in the operational mode, the electronic control system 18 engages the locking mechanism 54 at block 206 to prevent the ignition switch 44 from being rotated to the first position. As such, the vehicle 10 is prevented from being turned OFF while the vehicle 10 is moving.

If the vehicle 10 is determined not to be in the operational mode, the locking mechanism 54 is disengaged at block 208. At block 210, the electronic control system 18 determines if the ignition switch 44 has been returned to the first position. If not, the method 200 returns to block 204 and monitors the vehicle 10 for the operational mode. If the ignition switch 44 has been returned to the first position, the method 200 ends at block 212 with the operational state of the vehicle being set to OFF.

Although not specifically shown, in the event that battery power is lost or the electronic control system 18 becomes reinitialized while the ignition switch in an ON position, rotation to the OFF position will be allowed following the method shown in FIG. 6. For cases where rotation to the OFF position is allowed but where authorization has not been granted or maintained, engine operation shall remain disabled even in the event that rotation back to the ON position is allowed.

One advantage of the method and system described above is that a keyless ignition system is provided that allows the driver to operate the ignition switch with the familiar rotary action, as opposed to a start button. Another advantage is that the ignition switch may only be operated by authorized parties. A further advantage is that the driver is notified when the vehicle is shut off without an authorized key being present within the authorization zone and given the opportunity to restart the vehicle before the ignition switch is locked.

A further advantage is that rotation of the ignition switch to the off position, with additional notification, is prevented when an automatic transmission vehicle is not a suitable condition to park. Additionally, with a manual transmission vehicle, rotation to OFF, and the subsequent locking of the steering wheel or column, is prevented when the vehicle is above the predetermined speed threshold. The method and system also avoids unnecessary actuations of the locking mechanism which reduces wear and customer perceived sounds. Also, globally accepted levels of vehicle theft deterrence while minimizing customer inconveniences which can result from a "keyless ignition" system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an operational state of a vehicle having a keyless rotary ignition switch and a locking mechanism coupled to the keyless rotary ignition switch, the method comprising:
    disengaging the locking mechanism to allow the keyless rotary ignition switch to be rotated from a first position to a second position by a user when an electronic authorization is detected, wherein the detection of the electronic authorization comprises determining if an authorized electronic device is within an authorization zone of the vehicle;
    engaging the locking mechanism to prevent the keyless rotary ignition switch from being rotated from the first position to the second position by the user when no electronic authorization is detected;
    re-determining if an authorized electronic device is within the authorization zone of the vehicle if the keyless rotary ignition switch is rotated to the first position;
    re-engaging the locking mechanism to prevent the keyless rotary ignition switch from being rotated from the first position to the second position if an authorized electronic device is determined to be within the authorization zone of the vehicle; and
    maintaining disengagement of the locking mechanism for a period of time to allow the keyless rotary ignition switch to be rotated from the first position to the second position if no authorized electronic device is determined to be within the authorization zone of the vehicle.

2. The method of claim 1, further comprising disengaging the locking mechanism to allow the keyless rotary ignition switch to be rotated to a third position without re-determining if an authorized electronic device is within the authorization zone of the vehicle.

3. The method of claim 2, further comprising engaging the locking mechanism to prevent the keyless rotary ignition switch from being rotated to the second and third positions if the keyless rotary ignition switch is returned to the first position.

4. The method of claim 2, further comprising:
    setting the operational state of the vehicle to OFF when the keyless rotary ignition switch is in the first position; and
    setting the operational state of the vehicle to ON when the keyless rotary ignition switch is in the second or third positions.

5. The method of claim 1, wherein the locking mechanism remains disengaged for a predetermined amount of time after the disengaging of the locking mechanism.

6. The method of claim 1, wherein the determining if an authorized electronic device is within the authorization zone for the vehicle comprises receiving a request for authorization sent by a user of the vehicle.

7. The method of claim 6, wherein a sending of the request for authorization by the user of the vehicle comprises at least one of applying a force in a direction parallel to an axis of rotation of the keyless rotary ignition switch and pressing a brake pedal of the vehicle.

8. The method of claim 1, further comprising alerting the user of the vehicle if no authorized electronic device is determined to be within the authorization zone of the vehicle.

9. The method of claim 8, further comprising re-engaging the locking mechanism to prevent the keyless rotary ignition switch from being rotated from the first position to the second position if an authorized electronic device is determined to be within the authorization zone of the vehicle within a second pre-determined amount of time.

10. A method for controlling an operational state of an automobile having a keyless rotary ignition switch and a locking mechanism coupled to the keyless rotary ignition switch, the method comprising:
    engaging the locking mechanism to prevent the keyless rotary ignition switch from being rotated from an ON position to an OFF position if at least one of a transmission of the automobile is in an operational mode and a speed of the automobile is greater than a predetermined threshold;
    disengaging the locking mechanism to allow the keyless rotary ignition switch to be rotated from the ON position to the OFF position if the transmission of the automobile is in a non-operational mode and the speed of the automobile is not greater than the predetermined threshold;
    determining if an authorized electronic key is within an authorization zone of the automobile;
    engaging the locking mechanism to prevent the keyless rotary ignition switch from being rotated from the OFF position to the ON position by a user if no authorized electronic key is determined to be within the authorization zone of the automobile;
    disengaging the locking mechanism to allow the keyless rotary ignition switch to be rotated from the OFF position to the ON position by the user if an authorized electronic key is determined to be within the authorization zone of the automobile;
    re-determining if an authorized electronic key is within the authorization zone of the automobile if the keyless rotary ignition switch is rotated to the OFF position;
    re-engaging the locking mechanism to prevent the keyless rotary ignition switch from being rotated from the OFF position to the ON position if an authorized electronic key is determined to be within the authorization zone of the automobile; and
    maintaining disengagement of the locking mechanism for a period of time to allow the keyless rotary ignition switch to be rotated from the OFF position to the ON position if no authorized electronic key is determined to be within the authorization zone of the automobile.

11. The method of claim 10, wherein the locking mechanism remains disengaged for a predetermined amount of time after the disengaging of the locking mechanism.

12. The method of claim 11, wherein the determining if an authorized electronic key is within the authorization zone for the automobile comprises receiving a request for authorization sent by a user of the automobile.

13. The method of claim 12, further comprising:
    setting the operational state of the automobile to OFF when the keyless rotary ignition switch is in the OFF position; and
    setting the operational state of the vehicle automobile to ON when the keyless rotary ignition switch is in the ON position.

14. An automotive control system for an automobile, comprising:
    a keyless rotary ignition switch being rotatable between first and second positions;
    a locking mechanism coupled to and engageable with the keyless rotary ignition switch to prevent the rotation of the keyless rotary ignition switch; and a processor in operable communication with the keyless rotary ignition switch and the locking mechanism, the processor being configured to:

disengage the locking mechanism to allow the keyless rotary ignition switch to be rotated from the first position to the second position by a user when an electronic authorization is detected, wherein the detection of the electronic authorization comprises determining if an authorized electronic device is within an authorization zone of the automobile;

engage the locking mechanism to prevent the keyless rotary ignition switch from being rotated from the first position to the second position by the user when no electronic authorization is detected;

re-determine if an authorized electronic device is within the authorization zone of the automobile if the keyless rotary ignition switch is rotated to the first position;

re-engage the locking mechanism to prevent the keyless rotary ignition switch from being rotated from the first position to the second position if an authorized electronic device is determined to be within the authorization zone of the automobile; and maintain disengagement of the locking mechanism for a period of time to allow the keyless rotary ignition switch to be rotated from the first position to the second position if no authorized electronic device is determined to be within the authorization zone of the automobile.

15. The automotive control system of claim 14, further comprising a transmission, the processor being in operable communication with the transmission, and wherein the processor is further configured to:

engage the locking mechanism to prevent the keyless rotary ignition switch from being rotated from the second position to the first position if at least one of the transmission is in an operational mode and a speed of the automobile is greater than a predetermined threshold; and disengage the locking mechanism to allow the keyless rotary ignition switch to be rotated from the second position to the first position if the transmission of the automobile is in a non-operational mode and the speed of the automobile is not greater than the predetermined threshold.

16. The automotive control system of claim 15, wherein the processor is further configured to:

set an operational state of the automobile to OFF when the rotary ignition switch is in the first position; and set an operational state of the automobile to ON when the rotary ignition switch is in the second position.

17. The automotive control system of claim 16, wherein the locking mechanism comprises at least one of a solenoid and an electric motor.

18. The automotive control system of claim 17, further comprising at least one antenna in operable communication with the processor to receive an identification signal from an authorized electronic key.

* * * * *